(12) United States Patent
Lopez et al.

(10) Patent No.: US 7,134,377 B2
(45) Date of Patent: Nov. 14, 2006

(54) VACUUM BRAKE BOOSTER

(75) Inventors: Carlos Erviti Lopez, Pamplona (ES); Isabel Larumbe San Martin, Baranain (ES)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/427,632

(22) Filed: Apr. 30, 2003

(65) Prior Publication Data

US 2003/0183072 A1    Oct. 2, 2003

Related U.S. Application Data

(63) Continuation of application No. PCT/EP01/12541, filed on Oct. 30, 2001.

(30) Foreign Application Priority Data

Nov. 2, 2000   (DE) ................ 100 54 251

(51) Int. Cl.
   *F15B 9/10*   (2006.01)
(52) U.S. Cl. ................ 91/376 R; 264/328.12
(58) Field of Classification Search ............. 91/376 R, 91/369.1–369.4; 264/328.12, 328.18
   See application file for complete search history.

(56) References Cited

U.S. PATENT DOCUMENTS

| | | | |
|---|---|---|---|
| 3,880,978 A | 4/1975 | Apostoleris et al. | |
| 3,897,718 A | 8/1975 | Gardner et al. | |
| 4,286,501 A | 9/1981 | Thomas et al. | |
| 4,350,076 A | 9/1982 | Thiel | |
| 4,587,885 A * | 5/1986 | Boehm et al. ............. | 91/376 R |
| 4,654,181 A | 3/1987 | Brandenstein et al. | |
| 4,726,925 A * | 2/1988 | Binder ................... | 264/328.12 |
| 5,337,650 A * | 8/1994 | Uyama ..................... | 91/376 R |
| 5,704,271 A * | 1/1998 | Ikeda ....................... | 91/376 R |
| 5,759,647 A * | 6/1998 | Kuroda et al. ........... | 264/328.8 |
| 6,013,219 A | 1/2000 | DeGrenier | |
| 6,212,993 B1 | 4/2001 | Larumbe | |
| 6,505,539 B1 | 1/2003 | Schlüter | |
| 2002/0073835 A1 | 6/2002 | Schluter | |

FOREIGN PATENT DOCUMENTS

| | | |
|---|---|---|
| DE | 24 36 144 | 2/1975 |
| DE | 29 27 484 | 1/1980 |
| DE | 29 18 908 | 12/1980 |
| DE | 33 39 356 | 6/1985 |

(Continued)

*Primary Examiner*—F. Daniel Lopez
(74) *Attorney, Agent, or Firm*—MacMillan, Sobanski & Todd, LLC

(57) ABSTRACT

A vacuum brake booster having a vacuum chamber and a working chamber, which are separated from one another by a movable wall, and a control valve is described. The control valve has a control valve housing (10), which is coupled workingly to the movable wall and which, for achieving a pressure difference at the movable wall, is capable of controlling the supply of atmospheric pressure or above-atmospheric pressure to the working chamber in dependence upon the displacement of an input element of the vacuum brake booster. The control valve housing (10) comprises an outer sleeve (12) and an inner sleeve (48), which is disposed radially at the inside of and coaxially with the outer sleeve (12) and is connected by a plurality of webs (58, 62) to the outer sleeve (12). The control valve housing (10) is manufactured by injection molding, wherein at least one injection point (42) is provided, which is disposed in the region of the outer sleeve (12) and at a distance from fastening points of the webs (58, 62) to the outer sleeve (12).

20 Claims, 4 Drawing Sheets

FOREIGN PATENT DOCUMENTS

| | | |
|---|---|---|
| DE | 43 44 188 | 6/1995 |
| DE | 199 37 769 | 2/2001 |
| EP | 1 079 155 | 2/2001 |
| GB | 2 257 760 | 1/1993 |
| WO | 99/10216 | 3/1999 |
| WO | 00/07862 | 2/2000 |
| WO | 01/10694 | 2/2001 |

* cited by examiner

VACUUM BRAKE BOOSTER

CROSS REFERENCE TO RELATED APPLICATIONS

This application is a continuation of International Application No. PCT/EP001/12541 filed Oct. 30, 2001, which claimed priority to German Patent Application No. 100 54 251.4 filed Nov. 2, 2000, the disclosures of which are incorporated herein by reference.

BACKGROUND OF THE INVENTION

The invention relates to a vacuum brake booster, having a vacuum chamber and a working chamber separated from one another by a movable wall, and a control valve which comprises a control valve housing coupled workingly to the movable wall and which, for achieving a pressure difference at the movable wall, is capable of controlling the supply of atmospheric pressure or above-atmospheric pressure to the working chamber in dependence upon the displacement of an input element of the vacuum brake booster, wherein the control valve housing comprises an outer sleeve and an inner sleeve, which is disposed radially at the inside of and coaxially with the outer sleeve and is connected by a plurality of webs to the outer sleeve.

Such a vacuum brake booster in tandem-design is known from DE-OS 24 36 144, and corresponding U.S. Pat. No. 3,897,718 which is incorporated by reference herein. In accordance with the tandem design, a housing of the vacuum brake booster is divided by stationary walls into two separate housing portions each of a fixed volume. Each of said two separate housing portions is subdivided by a movable wall into a vacuum chamber and a working chamber. Altogether, the vacuum brake booster known from DE-OS 24 36 144 comprises two movable walls, which are disposed inside the housing of the vacuum brake booster and coupled rigidly to a control valve housing.

Given a movement of the control valve housing relative to the housing of the vacuum brake booster, vacuum-tight guidance of the control valve housing has to be guaranteed. For said reason, an outer sleeve of the control valve housing has radially at the outside two axially offset sliding surfaces, on each of which a ring seal sealing a stationary wall in the direction of the control valve housing slides.

The outer sleeve is connected by a plurality of webs to an inner sleeve so as to produce an air flow path between outer sleeve and inner sleeve. The inner sleeve functions as a guide for an actuating piston, which is coupled to the input element of the vacuum brake booster and cooperates via a cylindrical sensing element with an elastomer reaction disk. The actuating forces, which the actuating piston introduces into the reaction disk by means of the sensing element and which are summoned up by the driver, are transmitted from the reaction disk to a reaction piston. Besides the actuating forces, the booster forces attributable to the displacement of the movable walls coupled to the control valve housing are additionally introduced into the reaction disk by means of an end face coupled to the inner sleeve. The booster forces are transmitted from the outer sleeve of the control valve housing by means of the plurality of webs to the inner sleeve.

SUMMARY OF THE INVENTION

The object underlying the invention is to provide a vacuum brake booster in which the booster forces introduced into the control valve housing are reliably transmitted to the reaction piston.

Proceeding from a vacuum brake booster of the type initially described, said object is achieved according to the invention in that the control valve housing is manufactured by injection molding and in that for the injection moulding at least one injection point is provided, which is disposed in the region of the outer sleeve and at a distance from fastening points of the webs to the outer sleeve.

The manufacture of a control valve housing of a vacuum brake booster by means of injection molding is advantageous in terms of cost. In the case of a complex workpiece such as the control valve housing, however, stability problems frequently arise in connection with injection molding techniques. Because of the high demands on the working connection between the outer sleeve and the inner sleeve of a control valve housing, the use of injection moulding techniques for the manufacture of control valve housings is therefore not without problems. It has now been discovered, however, that the arrangement according to the invention of the injection point makes it possible to realize highly stable injection-molded control valve housings.

The position of the injection point is advantageously selected in such a way that the injection point is offset in axial direction relative to the fastening points of the webs to the outer sleeve. Given such an axial offset, the position of the injection point in peripheral direction of the outer sleeve may correspond to the position of a fastening point in peripheral direction. According to a preferred embodiment, the injection point is disposed in a central region of the outer sleeve and preferably approximately in the middle between two opposite ends of the outer sleeve.

The control valve housing is preferably made of plastics material, e.g. of fibre-reinforced plastics material. Thus, the control valve housing manufactured by injection molding may be made of glass-fiber-reinforced polyester and, in particular, of PET. Injection molding allows an integral construction of the two axially spaced-apart sliding surfaces. The inner sleeve may be constructed integrally with the outer sleeve.

The vacuum brake booster according to the invention may be both a vacuum brake booster with only one movable wall as well as a tandem-design vacuum brake booster with two movable walls. In the case of a tandem-design vacuum brake booster, the outer sleeve may have two axially spaced-apart sliding surfaces, which enable vacuum-tight guidance of the control valve housing in the housing of the vacuum brake booster. The outer sleeve advantageously has different outside diameters in the region of the axially spaced-apart sliding surfaces in order to facilitate assembly of the vacuum brake booster. The outside diameter of the outer sleeve in the region of the sliding surface remote from the input element of the vacuum brake booster may in said case be greater than in the region of the sliding surface facing the input element.

At the transition between the two sliding surfaces the outer sleeve may be designed to receive a separate annular element, which is used to fasten a movable wall to the control valve housing. Preferably a stop is formed on the outer sleeve at the transition between the two sliding surfaces. The annular element cooperates with the stop in actuating direction of the vacuum brake booster and allows the introduction of booster forces into the outer sleeve.

According to a preferred embodiment of the invention, a sensing element is guided inside the inner sleeve, which element is coupled by means of the actuating piston to the input element of the vacuum brake booster and by means of which the actuating forces may be introduced into a reaction disk. A reaction piston may be guided on the inner sleeve radially at the outside thereof and comprises for said purpose an e.g. can-shaped portion, which embraces the radially outer side of the inner sleeve. The reaction disk may be disposed in the base of the sleeve-shaped portion of the reaction piston.

DETAILED DESCRIPTION OF THE INVENTION

Figure 1:
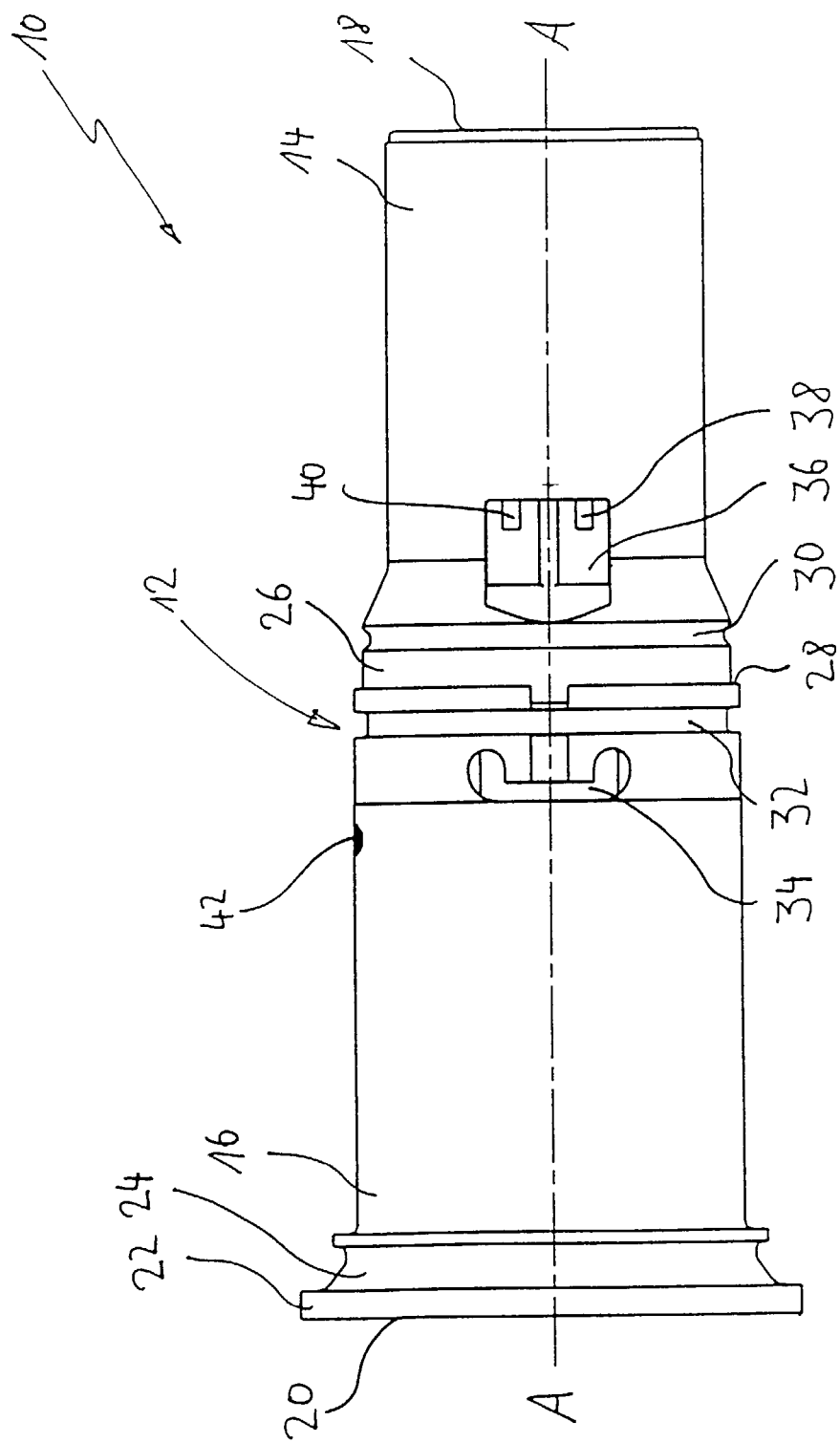
FIG. 1 the control valve housing of a vacuum brake booster according to the invention.

FIG. 1 shows an embodiment of a control valve housing 10 of a vacuum brake booster according to the invention. The control valve housing 10 comprises a substantially cylindrical outer sleeve 12, which has two axially spaced-apart, cylindrical sliding surfaces 14 and 16. In the installed state of the vacuum brake booster, a first end 18 of the control valve housing 10 faces an input element of the vacuum brake booster and a second, opposite end 20 of the control valve housing 10 faces a vacuum chamber of the vacuum brake booster.

The first sliding surface 14 of the control valve housing 10 verges directly into the first end 18 and has a smaller outside diameter than the second sliding surface 16. The second sliding surface 16 at its end facing the second end 20 of the control valve housing 10 opens into a diameter enlargement 22, within which a circumferential annular groove 24 is formed. The annular groove 24 is used to connect to the control valve housing 10 a diaphragm plate and a roller diaphragm, which together form a first movable wall. A second movable wall is fastened in the region of a transition 26 between the first sliding surface 14 and the second sliding surface 16 to the control valve housing 10 by means of an annular element, which is described in more detail further below. To enable an introduction of force from the annular element into the control valve housing 10 in actuating direction of the brake booster, i.e. in FIG. 1 to the left, a stop 28 is formed in the region of the transition 26. Circumferential annular grooves 30, 32 are disposed, one in actuating direction upstream and the other in actuating direction downstream of the stop 28, in the outer sleeve 12. The annular grooves 30, 32 are used to receive in each case a ring, which is provided for connecting the annular element to the control valve housing 10 and is not shown in FIG. 1.

The outer sleeve 12 of the control valve housing 10 has on opposite sides two openings 34, 36 each, which are spaced apart from one another in axial direction. The opening 34 facing the second end 20 of the control valve housing 10 connects the two vacuum chambers of the tandem-design vacuum brake booster. A crossbar which is coupled to an actuating piston and extends at right angles to the actuating piston projects, in the installed state of the vacuum brake booster, through the further opening 36 facing the end 18 of the control valve housing 10. Two web-shaped stops 38, 40 for the crossbar are formed inside the opening 36. The web-shaped stops 38, 40 guarantee that, even when the crossbar makes contact with the stops 38, 40, an air flow path remains open between the two stops 38, 40.

An injection point 42 of the injection-molded control valve housing 10 is disposed approximately in the middle between the two opposite ends 18, 20 of the control valve housing 10. The control valve housing 10 illustrated in FIG. 1 is made of glass-fiber-reinforced PET and is of a completely integral construction. In relation to the webs (not shown in FIG. 1) for connecting an inner sleeve (likewise not shown in FIG. 1) to the outer sleeve 12, the injection point 42 is offset axially in the direction of the second end 20 of the control valve housing 10. In peripheral direction of the outer sleeve 12, on the other hand, the position of the injection point 42 corresponds to the position of a web. The exact arrangement of the injection point 42 may be seen more clearly in the following figures.

Figure 2:
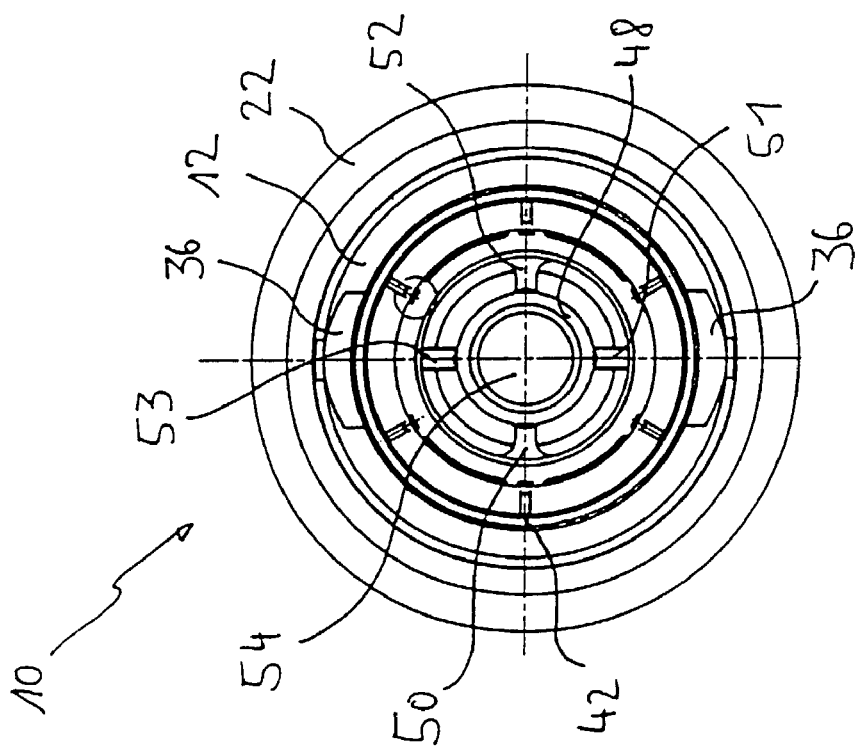
FIG. 2 a view of an end of the control valve housing according to FIG. 1 facing an input element of the vacuum brake booster.

FIG. 2 shows in plan view the first end 18 of the control valve housing 10 illustrated in FIG. 1. Clearly evident is the inner sleeve 48, which is fastened by a plurality of webs 50, 51, 52, 53 to the outer sleeve 12. The inner sleeve 48 has a central through-opening 54 which, in assembled state of the vacuum brake booster, functions as an axial guide for an actuating piston.

It is evident from FIG. 2 that the position of the injection point 42 in peripheral direction corresponds to the position of the web 50 in peripheral direction. However, in relation to a fastening point of the web 50 to the outer sleeve 12, the injection point 42 is offset axially into the drawing plane and hence disposed at a distance from the fastening point.

Figure 3:
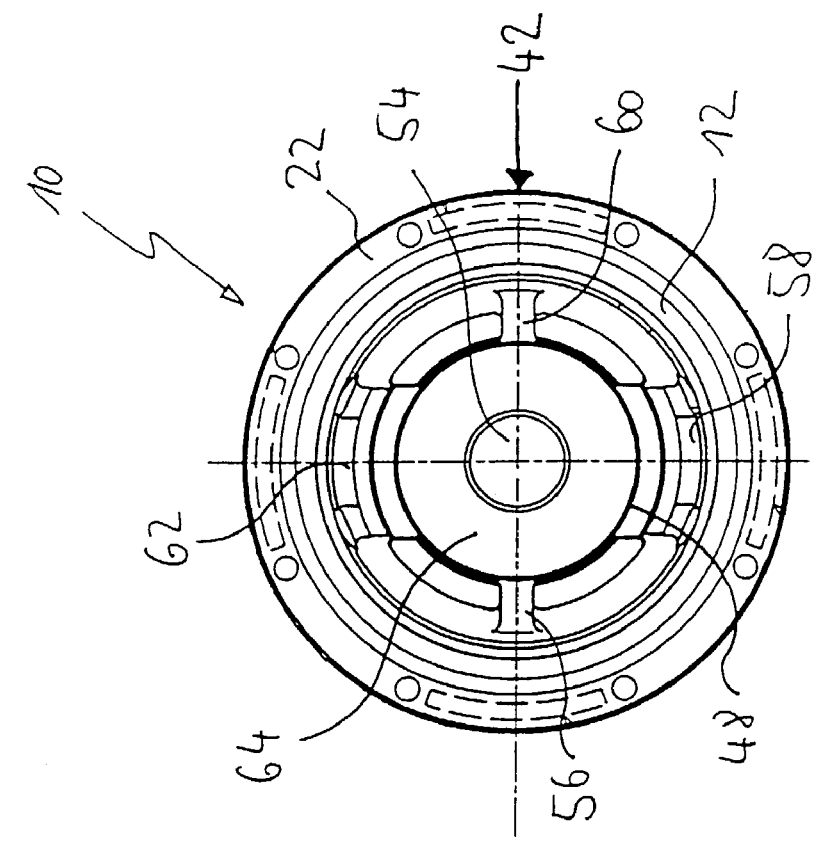
FIG. 3 a view of an end of the control valve housing according to FIG. 1 facing a vacuum chamber of the vacuum brake booster.

FIG. 3 shows a plan view of the second end 20 of the control valve housing 10 according to FIG. 1. Likewise clearly evident is the inner sleeve 48, which is connected by a plurality of further webs 56, 58, 60, 62 to the outer sleeve 12. The position of the injection point 42 on the outer periphery of the outer sleeve 12 is indicated by an arrow. In the view according to FIG. 3, the injection point 42 is concealed by the diameter enlargement 22 of the control valve housing 10.

As FIG. 3 reveals, the inner sleeve 48 has at its end facing the end 20 a circular end face 64, by means of which the booster forces are introduced into a reaction disk. The booster forces are transmitted from the outer sleeve 12 by means of the webs 56, 58, 60, 62 to the inner sleeve 48.

Figure 4:
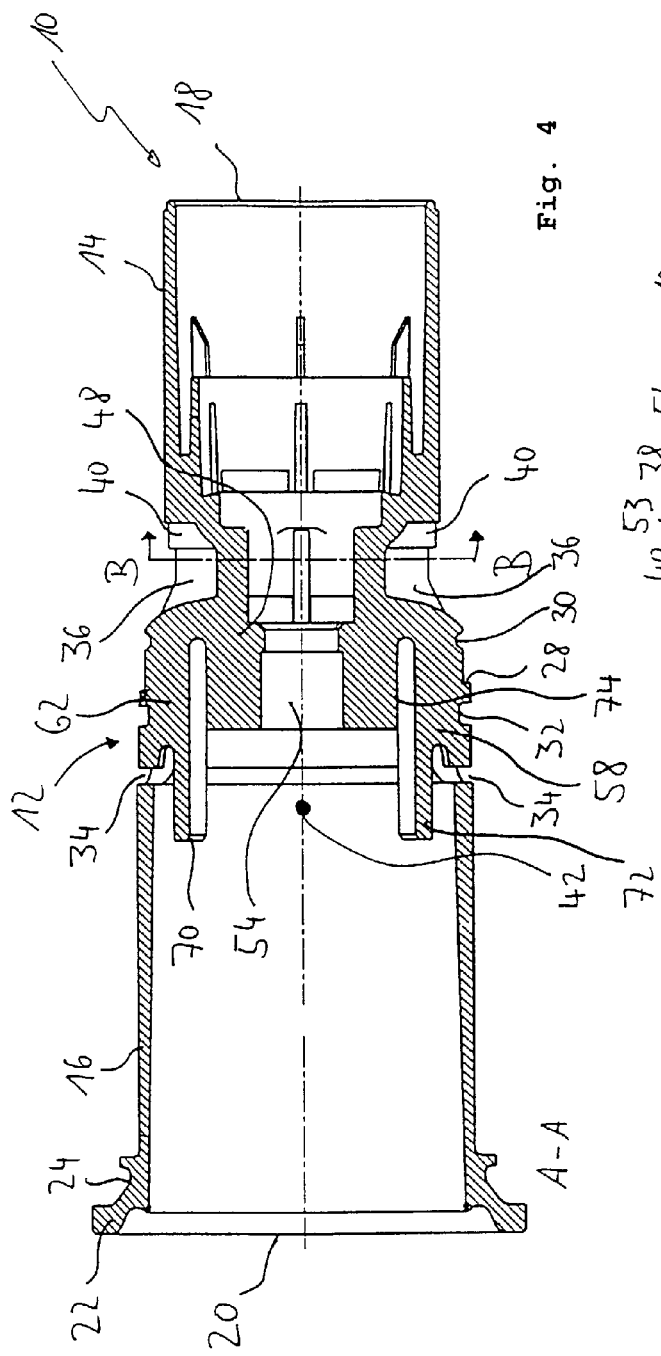
FIG. 4 a longitudinal section through the control valve housing according to FIG. 1 along the cutting line A—A.

FIG. 4 shows a longitudinal section A—A through the control valve housing 10 according to FIG. 1. In relation to the fastening points of the webs 58, 62 to the outer sleeve 12, the injection point 42 is offset in axial direction and disposed radially at the outside of the outer sleeve 12.

As FIG. 4 reveals, the control valve housing 10 comprises two tongue-shaped elements 70, 72, which extend counter to actuating direction from the webs 58, 62. A reaction piston (not shown in FIG. 4) of the vacuum brake booster is guided between the radially outer surface 74 of the inner sleeve 48 and the radially inner regions of the two tongue-shaped elements 70, 72.

Figure 5:
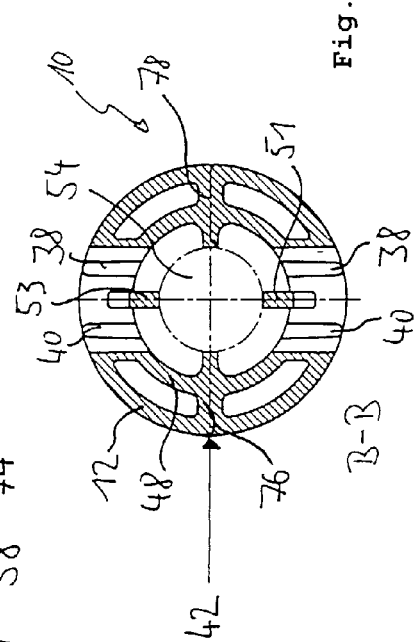
FIG. 5 a cross section through the control valve housing according to FIG. 1 along the cutting line B—B of FIG. 4.

FIG. 5 shows a cross section through the control valve housing 10 according to

FIG. 1 along the cutting line B—B of FIG. 4. The position of the injection point 42 in peripheral direction of the outer sleeve 12 is marked by an arrow and corresponds to the position of one of the two webs 76, 78, by means of which the inner sleeve 48 is connected to the outer sleeve 12, in peripheral direction. In relation to the fastening points of the webs 76, 78 to the outer sleeve 12, the injection point 42 is however offset in axial direction out of the drawing plane.

Figure 6:
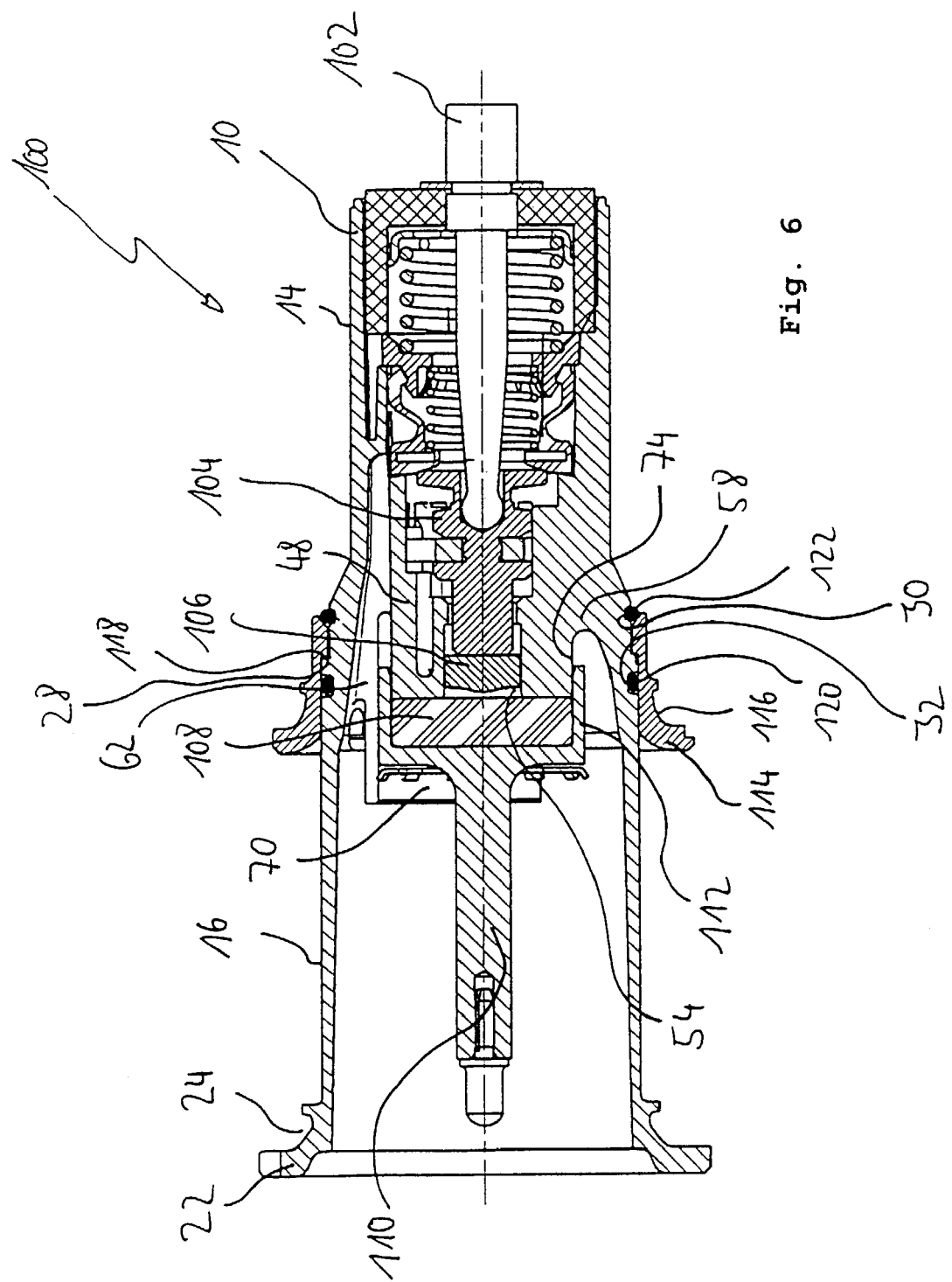
FIG. 6 a longitudinal section through a control valve of a vacuum brake booster according to the invention having the control valve housing according to FIGS. 1 to 5.

FIG. 6 shows a longitudinal section through a fully assembled control valve 100 having a control valve housing 10. Situated inside the control valve housing 10 is a force transmission arrangement, which comprises an input element 102, an actuating piston 104 coupled to the input element 102, a disk-shaped sensing element 106, an elastomer reaction disk 108 as well as a reaction piston 110. The reaction piston 110 cooperates with a master cylinder of a vehicle hydraulic brake system, which master cylinder lies functionally downstream of the brake booster and is not shown here. The mode of operation of a vacuum brake booster comprising the control valve 100 illustrated in FIG. 6 is described, for example, in WO 00/07862, to which reference is made in said respect and in respect of the refinement of the housing of the vacuum brake booster and the arrangement of the movable and stationary walls.

According to FIG. 6, the input piston 110 at its end facing the input element 102 has a can-shaped diameter enlargement 112, which is guided between the radially outer surface 74 of the inner sleeve 48 and the tongue-shaped elements 70, 72, of which one is shown in FIG. 6. The reaction disk 108 is disposed in the base of the can-shaped diameter enlargement 112. The sensing element 106 is guided in the central through-opening 54 of the inner sleeve 48.

Fastened to the radially outer side of the outer sleeve 12 is an annular element 114 having a groove 116 for receiving a diaphragm plate and a roller diaphragm, which together form a further movable wall. The annular element 114 has a complementary stop 118 to the stop 28 of the control valve housing 10 and hence allows the transmission of booster forces, introduced by means of the further movable wall into the annular element 114, to the outer sleeve 12. Two elastic rings 120, 122 accommodated inside the annular grooves 32, 36 of the outer sleeve 12 are provided for fastening the annular element 114 to the outer sleeve 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Vacuum brake booster, having a vacuum chamber and a working chamber separated from one another by a movable wall, a control valve which comprises a control valve housing coupled workingly to the movable wall and which, for achieving a pressure difference at the movable wall, is capable of controlling the supply of atmospheric pressure or above-atmospheric pressure to the working chamber in dependence upon the displacement of an input element of the vacuum brake booster, wherein the control valve housing comprises an outer sleeve and an inner sleeve, which is disposed radially at the inside of and coaxially with the outer sleeve and is connected by a plurality of webs to the outer sleeve,
wherein the control valve housing is manufactured by injection molding, and wherein at least one injection point is provided, which is disposed in the region of the outer sleeve and at a distance from fastening points of the webs to the outer sleeve, and wherein the outer sleeve comprises two opposite ends and the injection point is substantially spaced from the ends.

2. Vacuum brake booster according to claim 1,
wherein the injection point is offset in axial direction relative to the fastening points of the webs to the outer sleeve.

3. Vacuum brake booster according to claim 2,
wherein the position of the injection point in circumferential direction of the outer sleeve corresponds to the position of a fastening point of a web at the outer sleeve in circumferential direction.

4. Vacuum brake booster according to claim 1,
wherein the injection point is disposed approximately in the middle between the ends.

5. Vacuum brake booster according to claim 1,
wherein the control valve housing is made of a fibre-reinforced plastics material.

6. Vacuum brake booster according to claim 5,
wherein the plastics material is polyester.

7. Vacuum brake booster according to claim 1,
wherein the vacuum brake booster is of a tandem construction.

8. Vacuum brake booster according to claim 7,
wherein the outer sleeve comprises two axially spaced-apart sliding surfaces.

9. Vacuum brake booster according to claim 8,
wherein the two sliding surfaces are of an integral construction.

10. Vacuum brake booster according to claim 1,
wherein the inner sleeve is constructed integrally with the outer sleeve.

11. Vacuum brake booster according to claim 1,
wherein a sensing element is guided inside the inner sleeve.

12. Vacuum brake booster according to claim 1,
wherein a reaction piston is guided on the inner sleeve radially at the outside thereof.

13. Control valve housing for a vacuum brake booster, having an outer sleeve and an inner sleeve, which is disposed radially at the inside of and coaxially with the outer sleeve and is connected by a plurality of webs to the outer sleeve,
wherein the control valve housing is manufactured by injection molding and at least one injection point is provided, which is disposed in the region of the outer sleeve and at a distance from fastening points of the webs to the outer sleeve, and wherein the outer sleeve comprises two opposite ends and the injection point is substantially spaced from the ends.

14. Control valve according to claim 13,
wherein the injection point is offset in axial direction relative to the fastening points of the webs to the outer sleeve.

15. Control valve housing according to claim 14,
wherein the position of the injection point in circumferential direction of the outer sleeve corresponds to the position of a fastening point of a web at the outer sleeve in circumferential direction.

16. Control valve housing according to claim 13,
wherein the injection point is disposed approximately in the middle between the ends.

17. Control valve housing according to claim 13,
wherein the control valve housing is made of a fibre-reinforced plastics material.

18. Control valve housing according to claim 13,
wherein the vacuum brake booster is of a tandem construction, and wherein the outer sleeve comprises two axially spaced-apart sliding surfaces.

19. Control valve housing according to claim 18,
wherein the two sliding surfaces are of an integral construction.

20. Control valve housing according to claim 13,
wherein the inner sleeve is constructed integrally with the outer sleeve.

* * * * *